Sept. 30, 1969

H. G. GENTRY 3,469,673

CORRELATOR APPARATUS

Filed June 27, 1967

INVENTOR
HERMOND G. GENTRY
BY: *Walter M. Rodgers*
ATTORNEY

United States Patent Office 3,469,673
Patented Sept. 30, 1969

3,469,673
CORRELATOR APPARATUS
Hermond G. Gentry, Atlanta, Ga., assignor to The Mead Corporation, a corporation of Ohio
Filed June 27, 1967, Ser. No. 649,158
Int. Cl. B65g 47/71
U.S. Cl. 198—31                                3 Claims

ABSTRACT OF THE DISCLOSURE

The correlator apparatus as disclosed herein is for the purpose of forming a plurality of rows of objects from a single row of continuously moving objects and may constitute a convenient adjunct to a packaging machine. The apparatus comprises transport means for moving the objects in a single row together with two sets of spaced apart transfer elements arranged to move for a substantial distance alongside the path of movement of the objects, the transfer elements being arranged to move in a converging relation from opposite sides of the path of movement of the objects and being spaced so as to engage alternate ones of the objects in a complementary synchronous fashion and to impart transverse movement thereto. The speed of movement of the objects is correlated with the speed of movement of an outgoing conveyor means so as to cause transverse alignment of the objects in the different rows.

RELATED INVENTION

Figure 1:
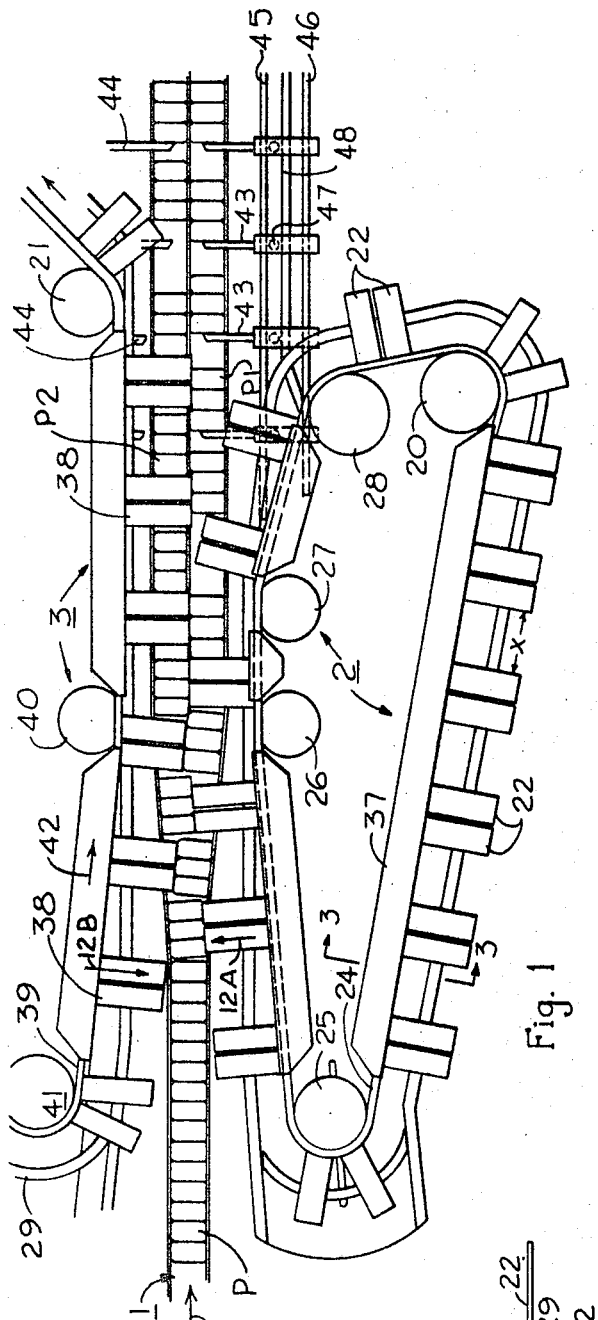

Correlating mechanisms for round primary packages such as that disclosed in U.S. Patent 2,752,027 are not satisfactory for use in conjunction with primary packages whose cross-section is square, rectangular or of some irregular configuration. Known arrangements for use in conjunction with such irregular, square, or rectangular primary packages ordinarily are slow in operation and frequently are characterized by reciprocable elements mounted alongside the path of movement of the primary packages and which reciprocate in a direction transverse with respect thereto. Such arrangements necessarily must operate at slow speeds or must operate intermittently in order to accommodate coordinated action of the various parts.

SUMMARY OF THE INVENTION

The invention in one form as applied to a correlator apparatus comprises two sets of synchronously movable transfer elements mounted on opposite sides of the path of movement of the objects the transfer elements being movable toward each other and toward the objects in a converging relation. The transfer elements are spaced from each other so that they can in effect mesh and thereby impart movement to alternate primary packages in opposite transverse directions. In this manner two or more rows of objects are formed from a single row of continuously moving objects.

DESCRIPTION OF THE DRAWING VIEWS

Figure 3:
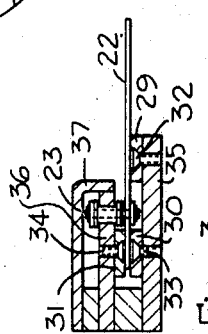
Figure 2:
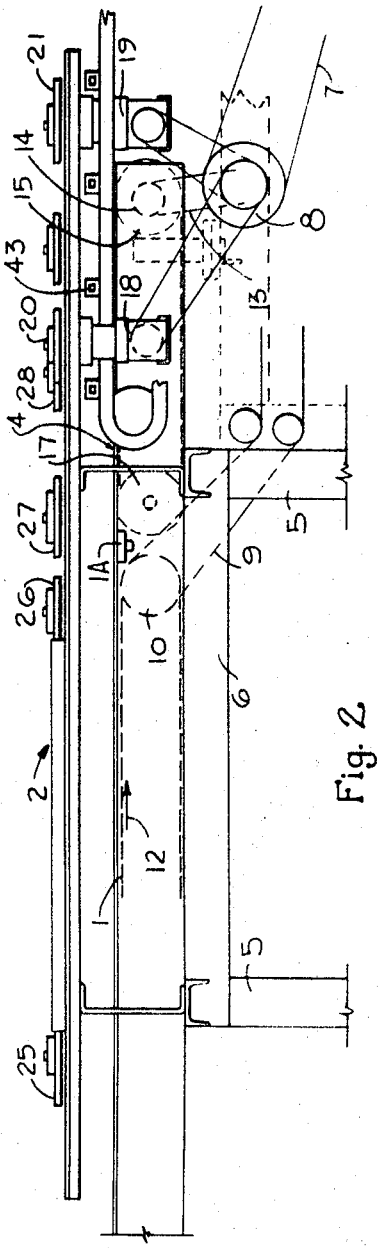

In the drawings of FIG. 1 is a plan view of a correlator apparatus constructed according to the invention; FIG. 2 is a side or front view of the apparatus depicted in FIG. 1 and FIG. 3 is a cross-sectional view of one of the transfer elements and associated apparatus taken along the line designated 3—3 in FIG. 1.

DETAILED DESCRIPTION

In the drawings the numeral 1 generally designates transport means for a plurality of rectangularly shaped primary packages P. The numeral 2 generally designates a set of main transfer elements mounted on any suitable means such as an endless chain. The numeral 3 generally designates a complementary system of transfer elements suitably mounted on an endless device such as a chain and the numeral 4 generally designates conveyor means for carrying away the primary packages after such packages are arranged in two rows suitable for admission to a packaging machine which may be of the type wherein a wrap-around blank is disposed about a number of primary packages arranged in two rows. Transfer plate 1A is interposed between conveyors 1 and 4.

The correlator assembly is mounted on suitable frame structure which may comprise upright pedestals 5 together with transversely disposed support structure 6 as best shown in FIG. 2.

Power may be supplied by any suitable means such for example as by endless chain 7 which imparts rotation to driven sprocket 8. Suitable coupling structure is provided whereby rotary motion is imparted through chain 9 and sprocket 10 to the incoming conveyor 1 which constitutes transport means the working reach of which is caused to move from left to right as indicated by the arrow 12. Suitable drive chain 13 is coupled with sprocket 8 and imparts rotary movement to driving sprocket 14 which in turn drives sprocket 15 and the upper reach of conveyor means 4 toward the right, conveyor 4 being supported at its left end by a sprocket 17.

The two sets of transfer elements designated generally by the numerals 2 and 3 are driven respectively by right angle gear boxes 18 and 19 and their associated sprockets 20 and 21.

The main transfer elements 22 are secured by pins 23 to endless element or chain 24 which is driven by sprocket 20 and which is supported by idler sprockets 25, 26, 27 and 28. Sprockets 20, 25, 26, 27 and 28 are mounted for rotation about suitable vertical shafts mounted on the frame of the machine. Transfer elements 22 are supported by wear plates 29, 30 and 31, such plates being affixed by screws 32, 33, and 34 to suitable supporting structure. For example, wear plates 29 and 30 are affixed to guide plate 35 by the screws 32 and 33 and the wear plate 31 is affixed to guide plate 36 by screw 34. A cover guide 37 is secured in place atop the path of movement of the chain 24.

As is apparent from FIG. 1, the transfer elements 22 are arranged in pairs and each pair of elements is spaced from its adjacent pair of elements by a distance as designated for example by the letter X at one point in FIG. 1. Thus, as the primary packages P are brought into the correlator on the transport means in the form of conveyor 1 they are engaged by the ends of the transfer elements 22 and hence are moved transversely as indicated by the arrow 12A. It is apparent in FIG. 1 that the width of the elements 22 is such that three primary packages P are moved simultaneously in a transverse direction. Of course any suitable width is chosen as desired. Furthermore, it is apparent that the path of movement of the transfer elements 22 is in a converging relation relative to the path of movement of the primary objects P so that smooth operation results.

On the other side of the path of movement of the primary articles P a separate complementary system of transfer elements generally designated by the numeral 3 is provided and comprises complementary transfer elements 38 mounted on a continuous chain 39 which is driven by sprocket 21 and which rides over idler sprockets 40 and 41. Of course the sprockets 21, 40 and 41 are mounted on vertical shafts which are supported by the frame of the machine in any suitable manner. Transfer elements 38 are mounted in the same manner as the transfer elements 22 as shown in FIG. 3 with the midportion of the transfer elements supported by wear plate 29.

From the discussion thus far it is apparent that the transfer elements 38, moving transversely as indicated by arrow 12B along the working reach of endless element or chain 39 as designated by the numeral 42, are also arranged to move in converging relationship to the path of movement of the objects P. The transfer elements 38 are herein referred to as complementary transfer elements and the transfer elements 22 are referred to herein for convenience as main transfer elements. Furthermore, it is apparent that the transfer elements 38 effectively engage and move a group of objects P transversely in the direction indicated by arrow 12B.

After the objects P are separated into more than one row packaging machine pusher bars 43 and 44 move inward in sequence and move the objects P from left to right. Packaging machine pusher bars 43 and 44 are mounted on chains 45 and 46 and move behind their associated articles such as P1 and P2 respectively due to engagement of their cams 47 with guides 48. For clarity the parts 45-48 are shown only for pusher bars 43. Of course a similar system of parts (not shown) is used to control the operation of pusher bars 44. The showing and description of the pusher bars and their associated parts are schematic. For a more complete disclosure of these parts reference may be had to United States Patent 2,751,730, issued June 26, 1956.

It is apparent that the main transfer elements 22 begin a withdrawal motion after such elements pass over the sprocket 27. Furthermore it is apparent that the main transfer elements 22 are completely free of the objects P before the corresponding complementary transfer elements 38 withdraw from the path of movement of the objects P. The objects such as P1 are "handed off" to pusher bars 43 and the packages P2 are subsequently placed under control of pusher bars 44. The objects P2 are then pushed toward the right at a faster pace than the objects P1 because the transfer elements 38 and 22 move at a faster rate than do the pusher bars 43, 44 until such time as objects P2 come into approximate transverse alignment with objects P1. The pusher bars preferably move sequentially into their respective pushing positions as shown in FIG. 1. The group of six or more such objects then enters the packaging machine in suitable condition for wrapping or for the performance of some other packaging operation as may be desired.

From the above description it is apparent that synchronous high speed operation of the main transfer elements 22 and their associated complementary transverse elements 38 is achieved and that such elements operate satisfactorily to divide a single row of objects into two or more rows of objects and that the machine is effective even though the objects P may be of a square, rectangular or irregular cross-sectional configuration.

The embodiments of the invention in which an exclusive property or privilege is claimed are defined as follows:

I claim:
1. A correlator apparatus for forming a plurality of rows of objects from a single row of continuously moving objects, said apparatus comprising transport means for moving the objects along a predetermined path in a single row, a main endless element having a working reach adjacent said path, a plurality of spaced apart main transfer elements mounted on said main endless element and arranged to move a substantial distance alongside and adjacent the path of movement of the objects, said transfer elements and said endless element being movable in the same general plane as the objects and the working reach of said endless element being arranged to move in a converging relation relative to the path of movement of the objects so as to engage certain ones of the objects and gradually to impart transverse movement thereto to form more than one row of objects while the objects are moving continuously, a complementary endless element having a plurality of complementary spaced apart transfer elements mounted thereon and disposed adjacent the path of movement of the objects and arranged with the working reach of said complementary endless element in converging relation to said path of movement to cause said complementary transfer elements to cooperate with said main transfer elements so as to engage certain other of the objects and to impart transverse movement thereto in a direction different from the direction of movement of said ones of the objects, said main transfer elements being arranged to move away from the path of movement of the objects before said complementary transfer elements are moved away from the path of movement of the objects following completion of the transverse movement of the associated objects.

2. Apparatus according to claim 1 wherein conveyor means of slower speed than said transport means is arranged to receive and move the objects after said main transfer elements move away from the path of movement of the objects and before said complementary transfer elements move away from the path of movement of the objects.

3. A correlator apparatus for forming a plurality of rows of objects from a single row of continuously moving objects, said apparatus comprising transport means for moving the objects along a predetermined path in a single row, a plurality of spaced apart main transfer elements mounted for movement a substantial distance alongside and adjacent the path of movement of the objects, said transfer elements being movable in the same general plane as the objects and being arranged to move in a converging relation relative to the path of movement of the objects so as to engage certain ones of the objects and to impart transverse movement thereto to form more than one row of objects while the objects are moving continuously, a plurality of complementary spaced apart transfer elements movably mounted adjacent the path of movement of the objects and arranged to cooperate with said main transfer elements so as to engage certain other of the objects and to impart transverse movement thereto in a direction different from the direction of movement of said ones of the objects, said main transfer elements being arranged to move away from the path of movement of the objects before said complementary transfer elements are moved away from the path of movement of the objects following completion of the transverse movement of the associated objects, conveyor means of slower speed than said transport means and arranged to receive and move the objects after said main transfer elements move away from the path of movement of the objects and before said complementary transfer elements move away from the path of movement of the objects, and a plurality of transversely movable pusher bars movable along the path of movement of said conveyor means, said pusher bars being disposed on opposite sides of the path of movement of the objects and being arranged to engage the objects in the adjacent row of objects respectively, the pusher bars disposed adjacent to said complementary transfer elements being arranged to engage the objects in the adjacent row subsequent to engagement of the objects in the remote row by the opposite pusher bars so as to enable said complementary transfer elements to move the objects interspersed therewith into transverse alignment with the objects in the opposite row of objects.

References Cited
UNITED STATES PATENTS

| 2,363,189 | 11/1944 | Magnusson. |
| 2,669,341 | 2/1954 | Holstebroe _____ 198—34 |
| 2,923,395 | 2/1960 | Hofe. |

EDWARD A. SROKA, Primary Examiner

U.S. Cl. X.R.
198—34